US009134598B2

(12) United States Patent
Zheng et al.

(10) Patent No.: US 9,134,598 B2
(45) Date of Patent: Sep. 15, 2015

(54) ELECTRONIC DEVICE

(71) Applicant: Lenovo Co., Ltd., Beijing (CN)

(72) Inventors: Xiaopan Zheng, Beijing (CN); Feijun Weng, Beijing (CN); Yunfeng Pan, Beijing (CN); Fei Wu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/076,851

(22) Filed: Nov. 11, 2013

(65) Prior Publication Data
US 2014/0132936 A1    May 15, 2014

(30) Foreign Application Priority Data

Nov. 13, 2012  (CN) .......................... 2012 1 0454329

(51) Int. Cl.
G03B 21/28    (2006.01)
G03B 21/14    (2006.01)
G06F 1/16     (2006.01)

(52) U.S. Cl.
CPC .............. *G03B 21/28* (2013.01); *G03B 21/145* (2013.01); *G06F 1/1639* (2013.01); *G06F 1/1647* (2013.01)

(58) Field of Classification Search
USPC ....................... 353/71, 79, 82, 119
See application file for complete search history.

(56) References Cited

U.S. PATENT DOCUMENTS 5,028,128 A * 7/1991 Onuki ........................... 353/122
5,235,362 A   8/1993 Kronbauer
5,428,415 A * 6/1995 Keelan et al. .................. 353/71
8,425,049 B2  4/2013 Hirata et al.
8,465,157 B2  6/2013 Ichikawa et al.
8,585,216 B2  11/2013 Ono et al.
8,690,349 B2  4/2014 Hirata et al.
2008/0074625 A1* 3/2008 Lai et al. ........................ 353/82
2010/0157256 A1  6/2010 Itoh et al.
2010/0171937 A1  7/2010 Hirata et al.
2010/0231868 A1* 9/2010 Chen et al. ..................... 353/82

(Continued)

FOREIGN PATENT DOCUMENTS

CN    1069131 A    2/1993
CN    101776839 A   7/2010

(Continued)

OTHER PUBLICATIONS

First Chinese Office Action regarding Application No. 201210454329.6, dated Apr. 13, 2015. Translation provided by Espace.

*Primary Examiner* — William C Dowling
(74) *Attorney, Agent, or Firm* — Harness, Dickey & Pierce, P.L.C.

(57) ABSTRACT

It is provided an electronic device including an opto-mechanical system and an optical unit; the opto-mechanical system is adapted to form projection light oriented in a first direction in accordance with a display data signal, the housing of the electronic device has a first opening on the emission path of the projection light; the optical unit is adapted to adjust a projection direction of the projection light; specifically, the optical unit has at least a first position and a second position, when the optical unit is in the first position, the projection light forms a projected image in the first direction; and when the optical unit is in the second position, the projection light has its direction adjusted by the optical unit to the second direction, and then forms a projected image along the second direction.

11 Claims, 4 Drawing Sheets

(56) References Cited

U.S. PATENT DOCUMENTS

| | | |
|---|---|---|
| 2010/0321643 A1 | 12/2010 | Ichikawa et al. |
| 2011/0075115 A1 | 3/2011 | Ono et al. |
| 2013/0229633 A1 | 9/2013 | Hirata et al. |
| 2014/0146294 A1 | 5/2014 | Hirata et al. |

FOREIGN PATENT DOCUMENTS

| | | |
|---|---|---|
| CN | 101930157 A | 12/2010 |
| CN | 102033403 A | 4/2011 |
| CN | 102236238 A | 11/2011 |

\* cited by examiner

ELECTRONIC DEVICE

CROSS-REFERENCES TO RELATED APPLICATIONS

The present application claims the priority of Chinese Patent Application No. 201210454329.6, titled "ELECTRONIC DEVICE", filed with the Chinese State Intellectual Property Office on Nov. 13, 2012, the entire disclosure of which is incorporated herein by reference.

FIELD

The present application relates to the technical field of electronic products, and particularly to an electronic device.

BACKGROUND

A projector is a projection device for magnifying images displayed, and is widely used in places such as conferences, technical lectures, network centers, monitoring centers and home theaters, etc. in the working process, the projector impinges light upon an image display element to generate an image, and then performs the projection through lens. Thus information is projected onto a target area (a larger plane or screen) such that each of the participants can view clearly the real-time displayed images.

Reference is made to FIG. 1, which shows a schematic view of projection mode of an existing projector.

As shown in FIG. 1, a conventional projector mainly employs a straight projection mode, by which, a projection screen is positioned in front of lens, the audience members can view only by the screen arranged in the front, which is of less maneuverability during practical application.

In addition, by the limit of principle of operation of the straight projection mode, the lens and the screen should have a predetermined distance therebetween to meet application requirements of clear projection. That is, according to the projector of straight projection mode, the requirement on the pace of the usage environments is high, if the space size is insufficient to meet the requirement on a predetermined distance between the lens and the screen, then clear projection may not be exhibited.

In view of this, It is desirable optimize the design of the projector in the prior art, so as to overcome the above drawbacks in the technology of the existing straight projection mode, and increase the maneuverability of the image projection, thus improving the user experience.

SUMMARY

In view of the above disadvantages, a technical problem to be solved by the present application is that, providing a projection-enabled electronic device, which is structurally optimized such that a projection direction may be adjusted according to the practical applications, and improves the user experience.

An electronic device according to the present application includes an opto-mechanical system and an optical unit, herein the opto-mechanical system is adapted to form projection light oriented in a first direction in accordance with a display data signal, a housing of the electronic device has a first opening on an emission path of the projection light; and the optical unit is adapted to adjust a projection direction of the projection light; herein, the optical unit has at least a first position and a second position, in the case where the optical unit is in the first position, the projection light forms a projected image in a first direction; and in the case where the optical unit is in the second position, the projection light has is adjusted by the optical unit to a second direction, and forms a projected image along the second direction.

Preferably, the optical unit is a reflector unit, and the reflector unit is movably connected with the housing by a support to facilitate the reflector switching between the first position and the second position.

Preferably, two ends of the support respectively articulated with the housing and the reflector unit; it is indicated that the reflector unit is in the first position in the case where the reflector unit and the support are superposed sequentially to an outer wall of the housing, and it is indicated that the reflector unit is in the second position in the case where a minor surface of the reflector unit is positioned in the emission path of the projection light.

Preferably, a positioning mechanism is provided at a position where the reflector unit is articulated to the support.

Preferably, the positioning mechanism is a bump and a pit cooperative with each other, one of the bump and the pit is arranged on the reflector unit, and the other one is arranged on the support; and one of the bump and the pit is provided by one, and the other one is provided in plurality at intervals along the active track thereof.

Preferably, a rotary damping mechanism is provided between the reflector unit and the support.

Preferably, spherical surface cooperation sets are provided between one end of the support and the housing as well as between the other end of the support and the reflector unit respectively; it is indicated that the reflector unit is in the first position in the case where the reflector unit and the support are superposed sequentially to an outer wall of the housing; and it is indicated that the reflector unit is in the second position in the case where a minor surface of the reflector unit is positioned in the emission path of the projection light.

Preferably, the electronic device further includes: a storage unit, adapted to store display data, and a processing unit, adapted to generate a display data signal according to the display data.

Preferably, in the case where the electronic device is arranged on a supporting surface and the optical unit is in the second position, the second direction is oriented to the supporting surface, to facilitate forming a projected image on the supporting surface by the projection light emitted by the electronic device arranged on the supporting surface.

Preferably, the electronic device includes at least one of: a touch sensitive unit and a display unit, here in the case where the electronic device is positioned on the supporting surface, the touch sensitive unit or the display unit is provided on a surface away from the supporting surface.

Preferably, the electronic device is in a plate shape, the touch sensitive unit or the display unit is provided on a plate surface of the electronic device, the first opening is provided on a side wall of the electronic device, and the optical unit is provided beside the first opening of the housing.

The electronic device according to the present application has a projection function, and in addition to a conventional straight projecting image manner, it also has a function for adjusting the projection direction. Specifically, a projection direction of projection light is adjusted by an optical unit, and the optical unit has at least a first position and a second position, in the case where the optical unit is in the first position, the projection light forms a projected image in the first direction, in this state, the opto-mechanical system forms a projection light oriented in a first direction in accordance with a display data signal; and in the case where the optical unit is in the second position, the projection light is adjusted by the optical unit to the second direction, and the projection light forms a projected image in a second direction. Thus, the operating position of the optical unit may be adjusted according to practical needs. Further the direction of the projection light is adjusted, which greatly enhances the adaptability of the function of projection thereof, and at the same time may improve the user experience effectively.

In a preferred embodiment, the optical unit is specifically a reflector unit, which movably connected with the housing by the support so as to be switched between the first position and the second position. Light path direction can be changed reliably by the reflector unit, that is, the light path direction is formed with an angle. On the basis of increasing the actual projection distance, on the basis of increasing the actual projection distance, it may also exhibit clear projection images without increasing a spatial distance of the light source from the projection surface, thus greatly saving the space.

In another preferred embodiment of the present application, two ends of the support respectively articulated with the housing and the reflector unit. it is indicated that the reflector unit is in the second position in the case where a minor surface of the reflector unit is positioned on the emission path of the projection light; and it is indicated that the reflector unit is in the first position in the case where the reflector unit and the support are superposed sequentially to an outer wall of the housing. That is, the reflector unit is stretchable with respect to the housing by the support. In this way, the reflector unit in the retracted state joints to the housing and therefore without interfering the other functions performed by the electronic device.

In another preferred embodiment of the present application, a positioning mechanism is additionally provided, and is arranged at a position where the reflector unit is articulated to the support, thereby ensuring that the reflector always in a determined position in the operation state, and providing a reliable guarantee for clear and stable of the projected image.

Figure 1:
FIG. 1 shows a schematic view of a straight projection mode of an existing projector.

Reference numerals in the FIGS. 2 to 9:

| 10 housing, | 11 first opening, | 20 reflector unit, |
| --- | --- | --- |
| 20' reflector unit, | 20" reflector unit, | 21 bump, |
| 30 support, | 31 pit, | 30' support, |
| 30" support, | 40 touch-sensitive unit and/or display unit, and | |
| 50 refractor unit. | | |

DETAILED DESCRIPTION

Based on a projection-enabled electronic device, an object of the present application is to adjust a projection direction of projection light by an optical unit, such that the electronic device is enabled to adjust the direction of the projection light while meeting the function of image straight projection. Specifically, the optical unit has at least a first position and a second position, and is configured such that: in the case where the optical unit is in the first position, the projection light forms a projected image in a first direction; in the case where the optical unit is in the second position, the projection light is adjusted to a second direction by the optical unit to the second direction, and forms a projected image in the second direction. Detail descriptions will be made hereinafter taken five specific embodiments for reference in conjunction with drawings.

Figure 2:
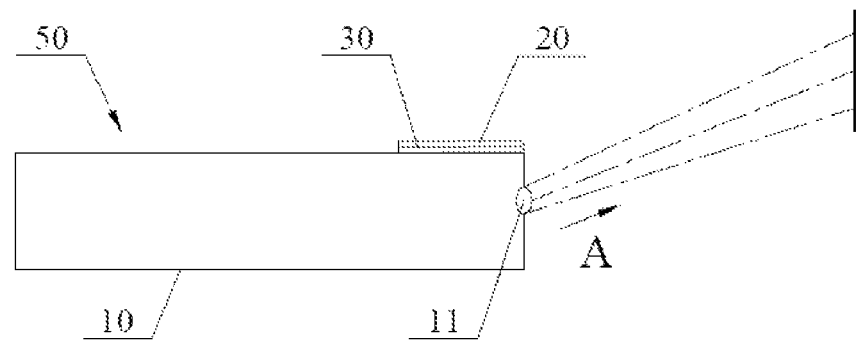
FIG. 2 is a schematic view showing an overall structure of an electronic device according to a first embodiment.

Embodiment 1:

Reference is made to FIG. 2, which shows a schematic view of an overall structure of an electronic device according to an embodiment.

An opto-mechanical system of the electronic device is adapted to form a projection light in a first direction A according to a display data signal. On the emission path of the projection light, a housing 10 of the electronic device has a first opening 11, for the purposes of forming an image on a projection plane. Specifically, the opto-mechanical system may be a device selected from any one of a liquid crystal display projection system (LCD), a digital lighting process projection system (DLP), a liquid crystal on silicon projection system (LCOS) and a laser scanning system (Laser), such that display data is processed by a respective electronic control circuit and projected to an external object to form an image, so long as the projection light can be formed. It should be understood that, the imaging engine principle of the opto-mechanical system directly determines a driven manner and a control circuitry system of the projection-enabled electronic device, which will not be further elaborated herein. Of course, if a liquid crystal display projection system (LCD), a digital lighting process projection system (DLP), or a liquid crystal on silicon projection system (LCOS) is adopted, an optical projection lens is then required to be embedded at the first opening 11.

In the present embodiment, the optical unit is specifically a reflector unit 20, the reflector unit 20 may be a planar reflection minor as shown in the drawings. The projection light is adjusted to a second direction B by the planar reflection minor to a second direction B, and travels in the second direction B to display the image in a geometric proportional variant form on a projection plane. Of course, the reflector unit is not limited to the planar minor as shown in the drawings; it may also be of an arc surface reflection minor (not shown). So that, the image, after being distorted, is projected onto the projection surface, which may meet requirements from different particular scenes.

Figure 3:
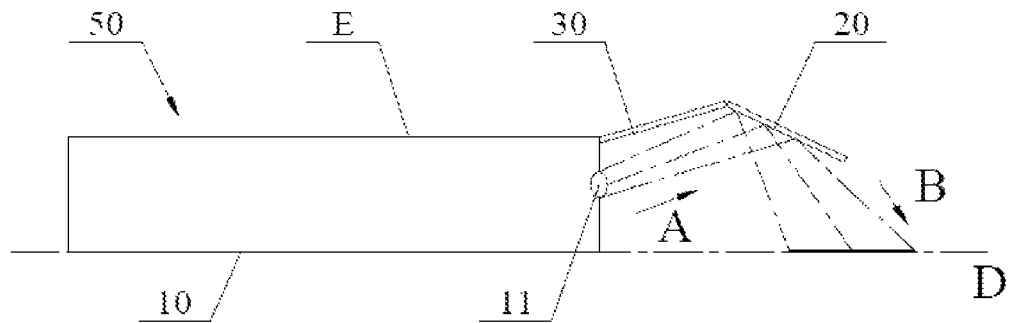
FIG. 3 is a schematic view of a reflector unit of the electronic device shown in FIG. 2 in a first position state.

Herein, the planar reflection minor functioning as a reflector unit 20 is movably connected with the housing 10 by a support 30, so as to be switched between the first position and the second position. Reference is made simultaneously to FIG. 3, which is a schematic view of a reflector unit of the electronic device shown in FIG. 2 in the first position state. That is, in the state shown in FIG. 2, the reflector unit 20 is away from the emission path of the projection light, and the projection direction at this time is just the first direction.

The "movable connection" relationship may be achieved by various structural forms. According to the present embodiment, the support 30 has two ends respectively articulated with the housing 10 and the reflector unit 20, and is configured such that: the reflector unit 20 and the support 30 in the first position are superposed sequentially to an outer wall of the housing 10 of the electronics device, as shown in FIG. 3; the mirror surface of the reflector unit 20 in the second position is positioned on the emission path of the projection light, that is, a junction between where the first direction A and the second directions B. That is, the reflector unit 20 is stretchable relative to the housing 10 by the support 30, thus, the reflector unit 20 and the support 30 in a retracted state joint to the housing 10 without causing any interference for other functions performed by an electronic device.

In addition, in order to ensure the reflector unit 20 always in a determined position when in operation, a positioning mechanism may be provided at a position where the reflector unit 20 is articulated with the support 30. The positioning mechanism may also take various structure forms, for example, a bump 21 is provided on the reflector unit 20, and a cooperative pit 31 is provided in the support 30. In the case where the reflector unit 20 rotates relative to the support 30 to the second position, the bump 21 on the reflector unit 20 is just embedded into the pit 31 of the support 30 to define the relative position between the reflector unit 20 and the support 30. Embedding depth is determined in combination of factors such as the material properties of the support 30 and the self weight of the reflector unit 20. In one aspect, a certain embedding depth is required for ensuring a reliable position limiting, in other aspect, it also needs to take rotational operability into consideration when setting the embedding depth.

Figure 4:
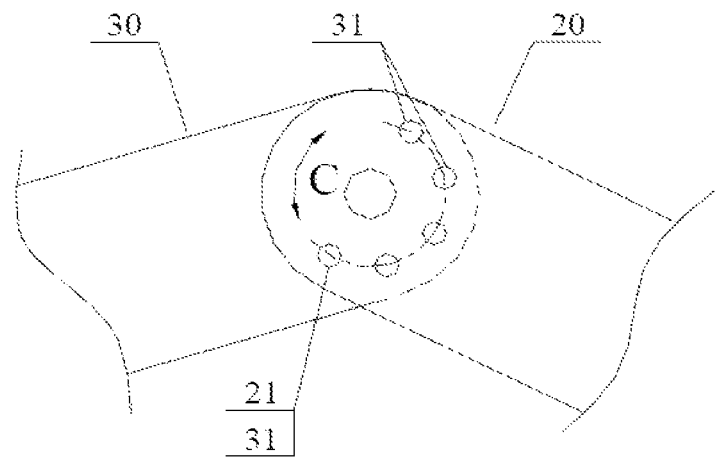
FIG. 4 is a schematic view showing a cooperation principle of a positioning mechanism of the electronic device according to the first embodiment.

As shown in FIG. 4 specifically, which is a schematic view showing a cooperation principle of the positioning mechanism in the present embodiment. According to the change of the projection size, the angle between the reflector unit 20 and the housing 10 can be adjusted for keystone correction. Based on this, one bump 21 is provided on the reflector unit 20, the cooperative pit 31 may be provided at intervals in the support 30 along the trajectory C thereof in plurality, and this may facilitate selecting the operation position of the reflector unit 20 according to practical need, thus the adaptability is increased. Of course, it may also be of such design, one pit is provided, and the cooperative bump along the trajectory thereof is provided in plurality. Similarly, the pit may be arranged in the reflector unit, and accordingly, the bump is provided on the support (not shown).

In addition to the aforementioned positioning mechanism, a rotary damping mechanism is provided between the reflector unit 20 and the support 30, specifically, may be provided on the articulating shaft. By the rotational friction between the reflector unit 20 and the support 30, the relative positional relationship between the reflector unit 20 and the support 30 may also be reliably defined.

Specifically, the electronic device may be a handset or a tablet computer. Besides the basis of conventional functions, the device also has a projection function. Constitution of elements and principle of operation achieving the conventional functions may be implemented according to the prior art. In order to achieving the projection function, the electronic device also includes a storage unit and a processing unit, the storage unit is provided for storing display data, this may facilitate the processing unit generating a display data signal from the display data. Herein, the display data stored in the storage unit may be pre-stored backup display data, or may be real time display data formed during the operation of the electronic device. In the practice, the display data signal generated in real time may be projected in the second direction, whether the handset or tablet making voice calls, or, in a network connection state.

As shown in FIG. 2, in the case that the electronic device is arranged on a supporting surface D, and the optical unit is in the second position. Herein, the second direction B is oriented to the supporting surface D, such that projection light emitted by the electronic device arranged on the supporting surface D forms a projected image on the supporting surface D, that is, the target area is positioned on the supporting surface D. For example, in a conference, by a handset or a tablet computer placed on a table, the participants can view the image displayed by the projection simultaneously, without a conference room equipped with a projection screen, thus further saving space for a conference.

Taken a handset or a tablet computer as an example, the corresponding electronic device includes a touch sensitive unit and/or a display unit 40. The touch sensitive unit and/or a display unit 40 is arranged on a plate surface of the electronic device, and the first opening 11 is provided on a side wall of the electronic device. As shown in the drawings, in the case where the respective electronic device is placed on the supporting surface D, the touch sensitive unit and/or the display unit is provided on a surface away from the supporting surface D, that is, a surface E faces up. Thus, the display unit displays images synchronously for viewing during the projection. That is, a handset or a display unit of a tablet PC may simultaneously display images together with the supporting surface D, that is, images from the both are synchronized. Specifically, the image projected on the supporting surface D is optically amplified and then presented, such that the participants may view shared information clearly. Of course, by adjusting positions of the support 30 and the reflector unit 20, in the case where the handset or the tablet computer is handheld by a person (without being placed on the supporting surface D), the display image can be projected on the desktop (supporting surface D).

In addition, the image displayed by the projection and the image displayed on the screen may be different, that is, the image displayed on the screen is independent of the image displayed by the projection. The image displayed by the projection may also be different but associated with the image displayed on the screen. Two situations of display will be briefly described hereinafter.

For example, the image displayed by the projection is an added content other than the content displayed on the screen (not amplified display), equivalently, on the basis of the handset or the display screen of the tablet computer, an extension display screen is added. Since the surface D is approximately parallel to the surface E, the user can simultaneously view two images displayed, thus the content that cannot be completely displayed by the handset or the display screen of the tablet computer may be simultaneously displayed on the two screens. For example, the content of two pages is displayed simultaneously, or, a text and an annotation are displayed simultaneously, or more map information, longer list, etc.

As another example, the touch sensitive unit facing up can be provided for an operator to perform necessary operations. For a touch sensing-enabled display unit, instructions input operation is usually performed by a virtual keyboard formed below the display area, the handset or a screen of a notebook computer shows the corresponding content. For example: the handset or the screen of the notebook displays the virtual keyboard (for operation) and an actual input content. In the case where the virtual keyboard displayed shades the input content, with the technical solution in this embodiment, the keyboard may be displayed on the device, while the input content may be displayed by the extension projection. Specifically, the control unit thereof, while displaying the virtual keyboard, may output and control a signal formed from amplifying and processing the image projected on the supporting surface D, so as to further improving the user experience.

It should be noted, according to this embodiment, the reflector unit 20 is provided besides the first opening 11 in the housing 10, and is positioned on the same plate surface with the touch sensitive unit and/or display in the case where the reflector unit 20 is in a retracted state. Apparently, the reflector unit 20 may also be provided at two side walls of housing 10 besides the first opening 11 in the case wherein the reflector unit 20 is in a retracted state. Especially, the multi-layer folded structure can accommodate a thinner housing size.

In particular, the electronic device may also be a digital camera/recording camera, a media player, a notebook computer, a gaming terminal, etc, it is also possible to be a projector only having a single function of projection, which all fall into the scope of protection claimed in the present application so long as the core idea of design of this application is applied.

Figure 5:
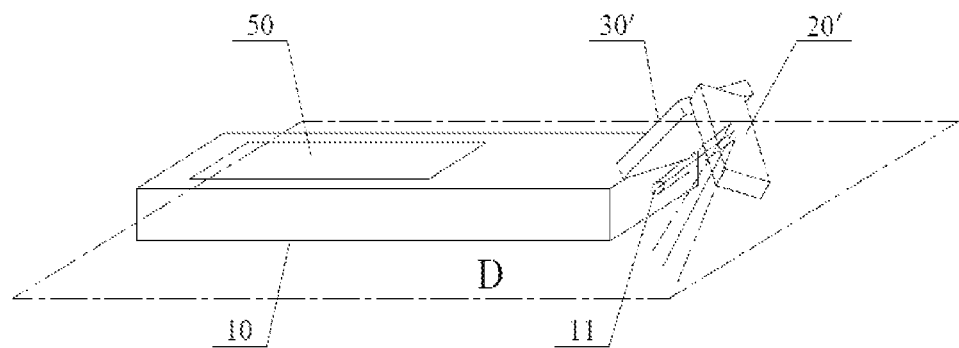
FIG. 5 is a schematic view showing an overall structure of an electronic device according to a second embodiment.

Embodiment 2:

Reference is made to FIG. 5, which is a schematic view showing an overall structure of an electronic device according to the second embodiment.

According to this embodiment, a reflector unit is adapted to adjust a direction of a light path, which is the same as those in the first embodiment, and this embodiment is different from the first embodiment in that spherical surface cooperation sets (not explicitly shown) are respectively provided between one end of the support 30' and the housing 10 as well as between the other end of the support 30' and the reflector unit 20' in this embodiment. The reflector unit 20' in a first position and the support 30' are superposed sequentially to the outer wall of the housing 10; the mirror surface of the reflector unit 20' in a second position is positioned on the emitting path of the projection light. For more clearly presenting the differences and associations between this embodiment and the first embodiment, the same elements are indicated by the same numerals in the drawings.

Compared with the first embodiment, since two ends of the support 30' are respectively spherical articulated to the housing 10 and the reflector unit 20' in this embodiment, every two connecting elements are rotatable with respect to each other in three dimensions, such that the target area of the projected image may be on the supporting surface D, and it may also be a wall body other than a horizontal supporting surface, and even an arbitrarily operable object, thus further increasing its maneuverability.

Figure 6:
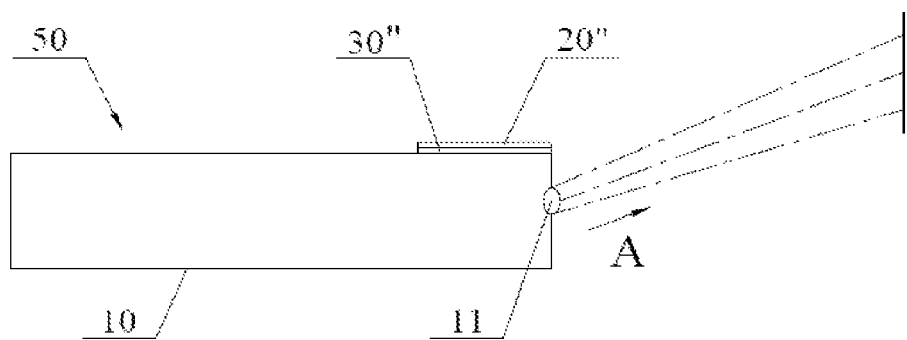
FIG. 6 is a schematic view showing an overall structure of an electronic device according to a third embodiment.
Figure 7:
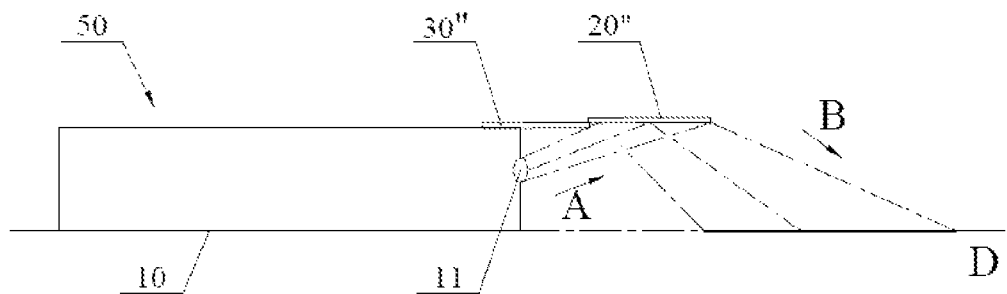
FIG. 7 is a schematic view of a reflector unit of the electronic device shown in FIG. 6 in the first position state.

Embodiment 3:

Reference is made to FIGS. 6 and 7, specifically, FIG. 6 is a schematic view of an overall structure of an electronic device according to a third embodiment, FIG. 7 is a schematic view of a reflector unit of the electronic device shown in FIG. 6 in a first position state.

Also, in the electronic device according to the present embodiment, a reflector unit is adapted to adjust the light path direction, which is the same as in the first and second embodiments. This embodiment is different from the first and second embodiments in that, the position switching of the reflector unit in this embodiment is of linear displacement, other constitution and principle of operation are the same as the above embodiments. In the present embodiment, a sliding cooperation set is provided between the reflector unit 20" and the housing 10. It is indicated that the reflector unit 20" is in the first position in the case where the reflector unit 20" joints to the outer wall of the housing 10 after being retracted, and the reflector unit 20" is away from the emission path of the projection light, at this time, the projection direction is a first direction A. It is indicated that the reflector unit 20" is in the second position in the case where the reflector unit 20" and the support 30" are stretched out, in this way, the direction of the projection light is adjusted by the planar reflection mirror to the second direction B. Obviously, the target area of the projected image may be on the supporting surface D.

In each of the electronic devices according to the three embodiments described above, a reflector unit is adapted to change the projection light path, in the optical unit of the embodiment provided hereinafter, a refraction principle is employed to change the projection light path.

Figure 8:
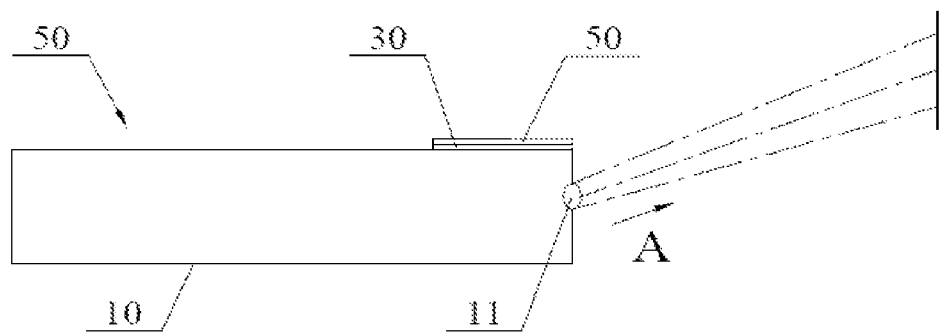
FIG. 8 is a schematic view showing an overall structure of an electronic device according to a fourth embodiment.
Figure 9:
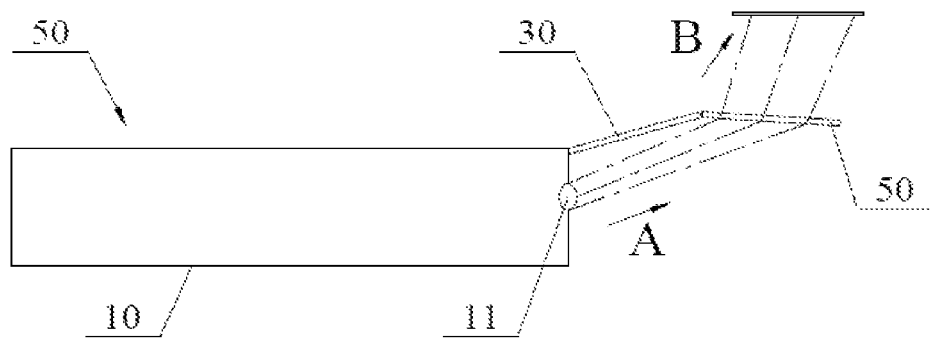
FIG. 9 shows a schematic view of a refractive unit of the electronic device shown in FIG. 8 in the first position.

Embodiment 4:

Reference is made to FIGS. 8 and 9, specifically; FIG. 8 is a schematic view of an overall structure of an electronic device according to a fourth embodiment, and FIG. 9 shows a schematic view of a refractor unit of the electronic device shown in FIG. 8 in a first position state.

In the present embodiment, according to the connection relationship between the refraction element 50 and the housing 10, a support 30 may also be adopted to perform the switching of the working positions of the refraction element 50. Specifically, the refractor unit 50 is made of at least two kinds of transparent materials of different refractive index. In this configuration, the projection light has different propagation speed if being propagated in the different transparent materials, thus the propagation direction is changes at the interface between adjacent two media, and the final projection direction can be controlled according to practical conditions.

The descriptions hereinbefore are only preferred embodiments of the present application, it should be noted, for one of ordinary skills in the art, various improvements and modifications can be made without departing from the principle underlying the application, and all of those improvements and modifications should also be deemed as falling into the scope of protection of the application.

The invention claimed is:

1. An electronic device, comprising:
   an opto-mechanical system, adapted to form projection light in a first direction in accordance with a display data signal, wherein a housing of the electronic device has a first opening on an emission path of the projection light; and
   an optical unit, adapted to adjust a projection direction of the projection light;
   wherein the optical unit has at least a first position and a second position, in the case where the optical unit is in the first position, the projection light forms a projected image in a first direction; and in the case where the optical unit is in the second position, the projection light is adjusted by the optical unit to a second direction, and forms a projected image in the second direction;
   wherein the optical unit is a reflector unit, and the reflector unit is movably connected with the housing by a support to facilitate the reflector switching between the first position and the second position;
   wherein two ends of the support respectively articulated with the housing and the reflector unit; it is indicated that the reflector unit is in the first position in the case where the reflector unit and the support are superposed sequentially to an outer wall of the housing; and it is indicated that the reflector unit is in the second position in the case where a mirror surface of the reflector unit is positioned in the emission path of the projection light.

2. The electronic device according to claim 1, wherein a positioning mechanism is provided at a position where the reflector unit is articulated to the support.

3. The electronic device according to claim 2, wherein the positioning mechanism is a bump and a pit cooperative with each other, one of the bump and the pit is arranged on the reflector unit, and the other one is arranged on the support; and one of the bump and the pit is provided by one, and the other one is provided in plurality at intervals along the active track thereof.

4. The electronic device according to claim 2, wherein a rotary damping mechanism is provided between the reflector unit and the support.

5. The electronic device according to claim 1, wherein spherical surface cooperation sets are provided between one end of the support and the housing as well as between the other end of the support and the reflector unit respectively; it is indicated that the reflector unit is in the first position in the case where the reflector unit and the support are superposed sequentially to an outer wall of the housing; and it is indicated that the reflector unit is in the second position in the case where a mirror surface of the reflector unit is positioned in the emission path of the projection light.

6. The electronic device according to claim 1, further comprising: a storage unit, adapted to store display data; and
a processing unit, adapted to generate the display data signal according to the display data.

7. The electronic device according to claim 6, wherein in the case where the electronic device is arranged on a supporting surface and the optical unit is in the second position, the second direction is oriented to the supporting surface, to facilitate forming a projected image on the supporting surface by the projection light emitted by the electronic device arranged on the supporting surface.

8. The electronic device according to claim 6, further comprising at least one of: a touch sensitive unit and a display unit, wherein in the case where the electronic device is positioned on a supporting surface, the touch sensitive unit or the display unit is provided on a surface away from a supporting surface.

9. The electronic device according to claim 8, wherein the electronic device is in a plate shape, the touch sensitive unit or the display unit is provided on a plate surface of the electronic device, the first opening is provided on a side wall of the electronic device, and the optical unit is provided beside the first opening of the housing.

10. The electronic device according to claim 1, wherein a positioning mechanism is provided at a position where the reflector unit is articulated to the support.

11. The electronic device according to claim 7, further comprising at least one of: a touch sensitive unit and a display unit, wherein in the case where the electronic device is positioned on the supporting surface, the touch sensitive unit or the display unit is provided on a surface away from the supporting surface.

* * * * *